United States Patent
Niitani et al.

(10) Patent No.: US 11,027,488 B2
(45) Date of Patent: Jun. 8, 2021

(54) THREE-DIMENSIONAL LAMINATING AND SHAPING APPARATUS, CONTROL METHOD OF THREE-DIMENSIONAL LAMINATING AND SHAPING APPARATUS, CONTROL PROGRAM OF THREE-DIMENSIONAL LAMINATING AND SHAPING APPARATUS, AND JIG

(71) Applicant: TECHNOLOGY RESEARCH ASSOCIATION FOR FUTURE ADDITIVE MANUFACTURING, Tokyo (JP)

(72) Inventors: Haruhiko Niitani, Shiga (JP); Yoshihito Fujita, Shiga (JP)

(73) Assignee: TECHNOLOGY RESEARCH ASSOCIATION FOR FUTURE ADDITIVE MANUFACTURING, Tokyo (JP)

(*) Notice: Subject to any disclaimer, the term of this patent is extended or adjusted under 35 U.S.C. 154(b) by 559 days.

(21) Appl. No.: 15/124,624

(22) PCT Filed: Mar. 25, 2016

(86) PCT No.: PCT/JP2016/059768
§ 371 (c)(1),
(2) Date: Sep. 8, 2016

(87) PCT Pub. No.: WO2017/163433
PCT Pub. Date: Sep. 28, 2017

(65) Prior Publication Data
US 2018/0133958 A1  May 17, 2018

(51) Int. Cl.
*B29C 67/00* (2017.01)
*B29C 64/245* (2017.01)
(Continued)

(52) U.S. Cl.
CPC ............ *B29C 64/245* (2017.08); *B22F 10/20* (2021.01); *B23K 26/144* (2015.10);
(Continued)

(58) Field of Classification Search
CPC ......... B33Y 10/00; B33Y 30/00; B33Y 50/00; B33Y 50/02
See application file for complete search history.

(56) References Cited

U.S. PATENT DOCUMENTS 5,039,913 A * 8/1991 Wegmann ........... C23C 14/3407
204/192.12
5,753,274 A  5/1998 Wilkening et al.
(Continued)

FOREIGN PATENT DOCUMENTS

EP  2 377 669 A1  10/2011
JP  2005-537134 A  12/2005
(Continued)

OTHER PUBLICATIONS

J-PlatPat English abstract of JP 2015-196265 A.
(Continued)

*Primary Examiner* — Ryan M Ochylski
(74) *Attorney, Agent, or Firm* — Ladas & Parry LLP

(57) ABSTRACT

A rise in temperature of a work (laminating base material) is controlled and the occurrence of thermal deformation is suppressed. There is provided a three-dimensional laminating and shaping apparatus having the following arrangement. That is, the three-dimensional laminating and shaping apparatus includes a material ejector that ejects a material of a three-dimensional laminated and shaped object onto a work on which the three-dimensional laminated and shaped object is shaped. The three-dimensional laminating and shaping apparatus includes a light beam irradiator that irradiates the ejected material with a light beam. Further-
(Continued)

more, the three-dimensional laminating and shaping apparatus includes a jig to which the work is detachably attached. The jig includes a channel supplied with a cooling medium for cooling the work.

5 Claims, 8 Drawing Sheets

(51) Int. Cl.
    *B33Y 30/00* (2015.01)
    *B33Y 50/02* (2015.01)
    *B23K 26/144* (2014.01)
    *B22F 10/20* (2021.01)
    *B33Y 10/00* (2015.01)
    *B23K 26/342* (2014.01)
    *B23K 26/70* (2014.01)
    *B29C 64/153* (2017.01)
    *B29C 64/393* (2017.01)
    *B29C 64/268* (2017.01)
    *B22F 10/10* (2021.01)

(52) U.S. Cl.
    CPC .......... *B23K 26/342* (2015.10); *B23K 26/703* (2015.10); *B29C 64/153* (2017.08); *B29C 64/268* (2017.08); *B29C 64/393* (2017.08); *B33Y 10/00* (2014.12); *B33Y 30/00* (2014.12); *B33Y 50/02* (2014.12); *B22F 10/10* (2021.01); *B22F 2999/00* (2013.01); *Y02P 10/25* (2015.11)

(56) References Cited

U.S. PATENT DOCUMENTS

| | | |
|---|---|---|
| 6,042,774 A | 3/2000 | Wilkening et al. |
| 2006/0032840 A1 | 2/2006 | Bagavath-Singh |
| 2011/0256253 A1 | 10/2011 | Amaya et al. |
| 2015/0159007 A1 | 6/2015 | Hirata |
| 2015/0209913 A1* | 7/2015 | Denney .............. B23K 35/0272 219/76.14 |
| 2015/0306823 A1 | 10/2015 | Askedall et al. |
| 2017/0144248 A1 | 5/2017 | Yoshimura et al. |

FOREIGN PATENT DOCUMENTS

| | | |
|---|---|---|
| JP | 2008-307895 A | 12/2008 |
| JP | 2015-112751 A | 6/2015 |
| JP | 2015-151566 A | 8/2015 |
| JP | 2015-178645 A | 10/2015 |
| JP | 2015-196265 A | 11/2015 |
| JP | 2015-196856 A | 11/2015 |
| WO | 2004/020139 A1 | 3/2004 |
| WO | 2008/143106 A1 | 11/2008 |
| WO | 2015/141031 A1 | 9/2015 |
| WO | 2015/151840 A1 | 10/2015 |

OTHER PUBLICATIONS

J-PlatPat English abstract of JP 2015-112751 A.
International Search Report (ISR) dated Jun. 21, 2016 for International Application No. PCT/JP2016/059768.
Written Opinion (WO) dated Jun. 21, 2016 for International Application No. PCT/JP2016/059768.
J-PlatPat English abstract of JP 2015-151566 A.
J-PlatPat English abstract of JP 2008-307895 A.
J-PlatPat English abstract of JP 2015-196856 A.
J-PlatPat English abstract of JP 2015/178645 A.
Extended European Search Report (ESR) dated Mar. 16, 2018 in connection with corresponding EP Application No. 16 826 689.8.

* cited by examiner

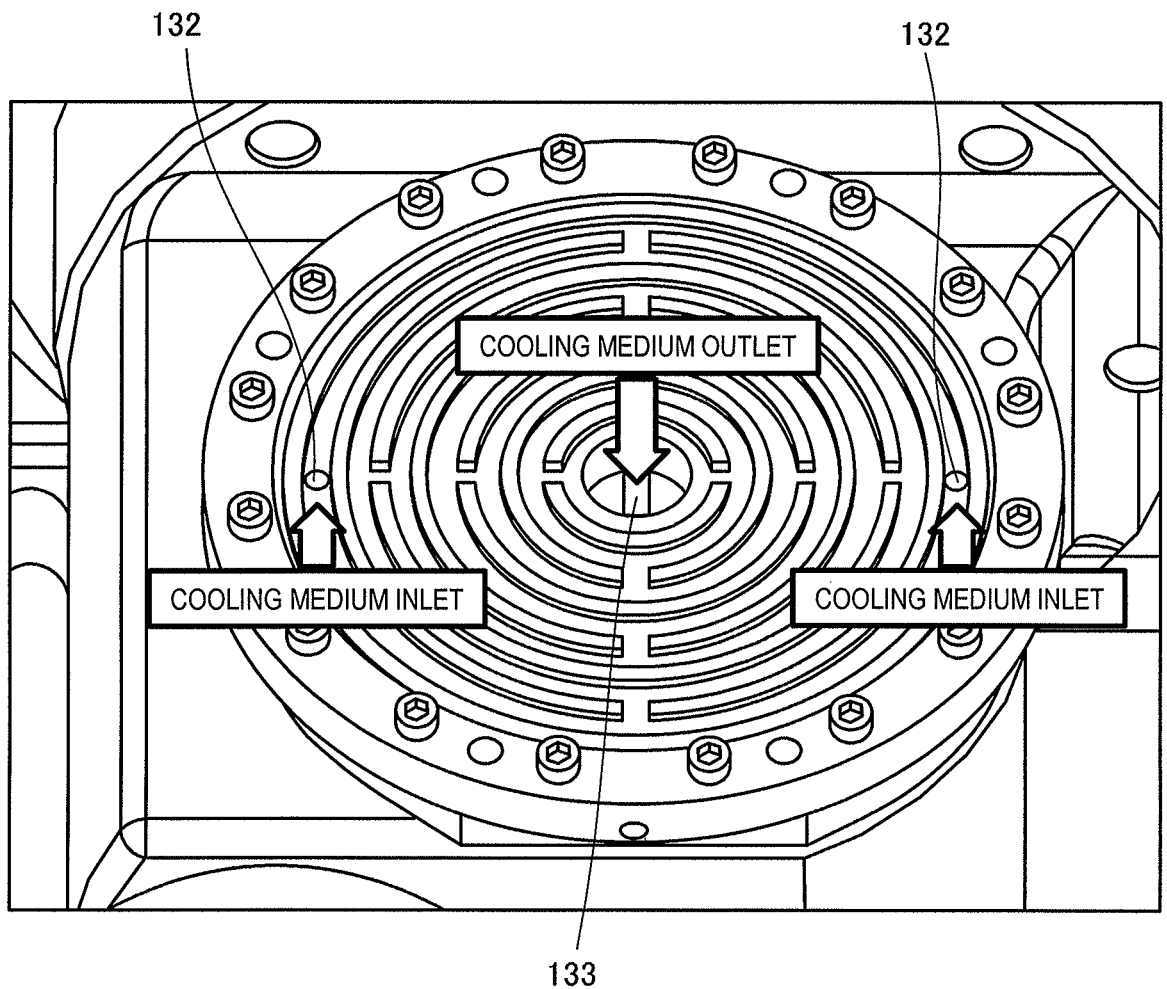
F I G. 3

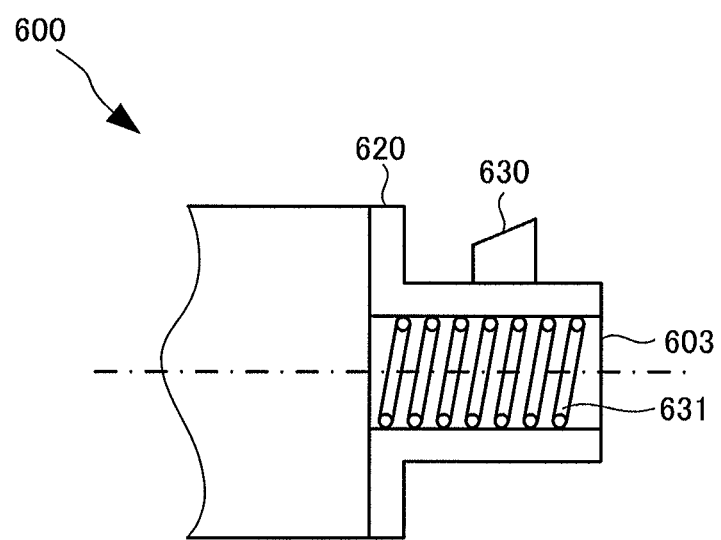
F I G. 6

THREE-DIMENSIONAL LAMINATING AND SHAPING APPARATUS, CONTROL METHOD OF THREE-DIMENSIONAL LAMINATING AND SHAPING APPARATUS, CONTROL PROGRAM OF THREE-DIMENSIONAL LAMINATING AND SHAPING APPARATUS, AND JIG

RELATED APPLICATION

This application is an application under 35 U.S.C. 371 of International Application No. PCT/JP2016/059768 filed on Mar. 25, 2016, the entire contents of which are incorporated herein by reference.

TECHNICAL FIELD

The present invention relates to a three-dimensional laminating and shaping apparatus, a control method of the three-dimensional laminating and shaping apparatus, a control program of the three-dimensional laminating and shaping apparatus, and a jig.

BACKGROUND ART

In the above technical field, patent literature 1 discloses a technique of cooling a heat shield plate by providing a cooling pipe on the outer surface of the cylindrical body of a Z-driving mechanism support (paragraphs [0029] and [0042] and the like of patent literature 1).

CITATION LIST

Patent Literature

Patent literature 1: Japanese Patent Laid-Open No. 2015-151566

SUMMARY OF THE INVENTION

Technical Problem

In the technique described in the above literature, however, it is impossible to shape a high-precision three-dimensional laminated and shaped object by controlling a rise in temperature of a work (laminating base material) and suppressing the occurrence of thermal deformation.

The present invention enables to provide a technique of solving the above-described problem.

Solution to Problem

One aspect of the present invention provides a three-dimensional laminating and shaping apparatus comprising:
a material ejector that ejects a material of a three-dimensional laminated and shaped object onto a work on which the three-dimensional laminated and shaped object is shaped;
a light beam irradiator that irradiates the ejected material with a light beam; and
a jig to which the work is detachably attached and that includes a channel supplied with a cooling medium for cooling the work.

Another aspect of the present invention provides a control method of a three-dimensional laminating and shaping apparatus, comprising:
ejecting a material of a three-dimensional laminated and shaped object onto a work on which the three-dimensional laminated and shaped object is shaped;
irradiating the ejected material with a light beam; and
supplying a cooling medium for cooling the work to a jig to which the work is detachably attached and that includes a channel supplied with the cooling medium.

Still other aspect of the present invention provides a control program of a three-dimensional laminating and shaping apparatus, for causing a computer to execute a method, comprising:
ejecting a material of a three-dimensional laminated and shaped object onto a work on which the three-dimensional laminated and shaped object is shaped;
irradiating the ejected material with a light beam; and
supplying a cooling medium for cooling the work to a jig to which the work is detachably attached and that includes a channel supplied with the cooling medium.

Still other aspect of the present invention provides a control program of a three-dimensional laminating and shaping apparatus, for causing a computer to execute a method, comprising:
ejecting a material of a three-dimensional laminated and shaped object onto a work on which the three-dimensional laminated and shaped object is shaped;
irradiating the ejected material with a light beam; and
supplying a cooling medium for cooling the work to a jig to which the work is detachably attached and that includes a channel supplied with the cooling medium based on a temperature of the work.

Still other aspect of the present invention provides a jig used for the aforementioned three-dimensional laminating and shaping apparatus, comprising:
a channel that is supplied with a cooling medium for cooling a work.

Advantageous Effects of Invention

According to the present invention, since a rise in temperature of a work (laminating base material) is controlled and the occurrence of thermal deformation is suppressed, it is possible to shape a high-precision three-dimensional laminated and shaped object.

BRIEF DESCRIPTION OF DRAWINGS

FIG. 3 is a perspective view for explaining the structure of the channels of the jig included in the three-dimensional laminating and shaping apparatus according to the first embodiment of the present invention;

FIG. 6 is a sectional view showing the arrangement of a three-dimensional laminating and shaping apparatus according to the second embodiment of the present invention;

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

A three-dimensional laminating and shaping apparatus 100 according to the first embodiment of the present invention will be described with reference to FIGS. 1 to 5.

<Technical Premise>

A three-dimensional laminating and shaping apparatus according to the technical premise of the three-dimensional laminating and shaping apparatus 100 according to this embodiment ejects a material of a three-dimensional laminated and shaped object onto a work (base plate) as a laminating base material, and irradiates the ejected material with a light beam such as a laser beam. The material irradiated with the light beam is melted by energy (heat) applied by the light beam, and is then solidified. When the material is solidified, the three-dimensional laminated and shaped object is shaped. In this case, since the three-dimensional laminated and shaped object is shaped on the work, the three-dimensional laminated and shaped object and the work are integrated.

During laminating and shaping of the three-dimensional laminated and shaped object, heat is supplied from the three-dimensional laminated and shaped object to the work by heat conduction, and the temperature of the work gradually increases by accumulation of heat. Thus, during laminating and shaping, thermal deformation occurs in the work, and influences the three-dimensional laminated and shaped object shaped on the work, thereby posing a problem that the three-dimensional laminated and shaped object is warped after completion of laminating and shaping. That is, the occurrence of thermal deformation decreases the shaping accuracy of the three-dimensional laminated and shaped object and the finishing processing accuracy, and also damages a jig on which the work is placed.

To cool the work, water, oil, or the like may be poured on the work. This method cannot be applied to a three-dimensional laminating and shaping apparatus that uses a metal powder as a material because the powder unwantedly gets wet. Alternatively, the work may be air-cooled by directly blowing air on it. If, however, cooling air is blown from the outside, the focusing property of the metal powder as a material degrades, and thus this method cannot be applied either. Furthermore, the work may be naturally cooled. However, it takes time to cool the work, thereby increasing the cycle time for shaping. Thus, this method cannot be applied.

Technique of Embodiment

Figure 1:
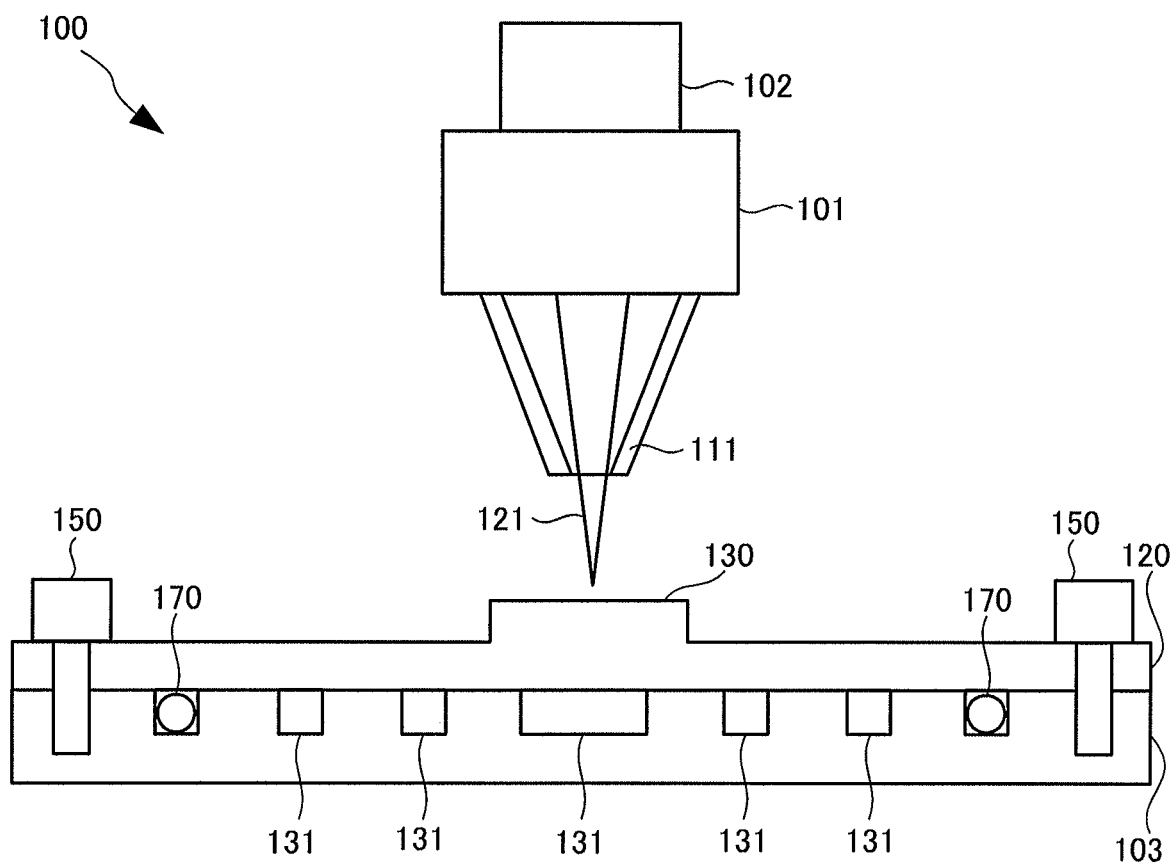
FIG. 1 is a view showing the arrangement of a three-dimensional laminating and shaping apparatus according to the first embodiment of the present invention.

FIG. 1 is a view showing the arrangement of the three-dimensional laminating and shaping apparatus 100 according to this embodiment. The three-dimensional laminating and shaping apparatus 100 is an apparatus for shaping a three-dimensional laminated and shaped object 130 by ejecting a material 111 onto a work 120, and irradiating the ejected material 111 with a light beam 121. An LMD (Laser Metal Deposition) type three-dimensional laminating and shaping apparatus will be exemplified as the three-dimensional laminating and shaping apparatus 100. Note that members and mechanisms unnecessary for the description and the like are not illustrated in FIG. 1, as needed.

As shown in FIG. 1, the three-dimensional laminating and shaping apparatus 100 includes a material ejector 101, a light beam irradiator 102, and a jig 103.

The material ejector 101 is a member for ejecting a metal powder as the material 111 of the three-dimensional laminated and shaped object 130 onto the work 120 on which the three-dimensional laminated and shaped object 130 is shaped, and is a nozzle-shaped member that is tapered toward the distal end. Note that the material 111 ejected by the material ejector 101 is not limited to the metal powder, and may be, for example, a resin powder.

The material 111 ejected from the distal end portion of the material ejector 101 is then irradiated with the light beam 121 such as a laser beam emitted from the light beam irradiator 102. The material 111 irradiated with the light beam 121 such as a laser beam is melted by heat applied from the light beam 121 to form a molten pool, and is then cooled and solidified.

Channels 131 through which a cooling medium flows are formed in the jig 103, and the work 120 is detachably attached to the jig 103. The work 120 is fixed to the jig 103 by, for example, a fixing tool 150 such as a clamp. That is, the channels 131 formed in the jig 103 have a groove shape open to the upper side (the upper surface of the jig 103), and are covered when the work 120 is placed on or attached to the upper surface of the jig 103.

Thus, when the back surface (lower surface) of the work 120 is brought into contact with the upper surface of the jig 103, the groove-shaped channels 131 open to the contact surface side are sealed. Consequently, even if a cooling medium such as a liquid or gas flows into the sealed channels 131, it never leaks. Note that a representative example of the cooling medium is water. The present invention, however, is not limited to this, and any medium having high cooling efficiency may be used. Since the back surface (lower surface) of the work 120 can be efficiently cooled, it is possible to suppress thermal deformation caused when the work 120 is heated. This can improve the shaping accuracy of the three-dimensional laminated and shaped object 130 and the finishing processing accuracy.

When shaping the three-dimensional laminated and shaped object 130 by arranging the jig 103 in a horizontal position, even if the work 120 is not placed on the jig 103 and fixed by the fixing tool 150 or the like, a problem hardly occurs. However, if the work 120 has a complicated shape or the three-dimensional laminated and shaped object 130 having a complicated shape is shaped on the work 120, the jig 103 may be inclined to perform shaping, and thus the work 120 is preferably fixed to the jig 103 by the fixing tool 150. If the work 120 is fixed to the jig 103 by the fixing tool 150 in this way, the sealing property of the channels 131 is maintained. Thus, if the cooling medium is a liquid or the like, the liquid never leaks outside, thereby making it possible to effectively cool the back surface (lower surface) of the work 120. Note that an O-ring 170 may be used to improve the sealing property of the channels 131.

The three-dimensional laminated and shaped object 130 is shaped on the work 120. Upon completion of shaping, the three-dimensional laminated and shaped object 130 is detached from the jig 103 together with the work 120. Note that the three-dimensional laminated and shaped object 130 and the work 120 may be integrated to form one product or may be separated after completion of shaping.

Figure 2:
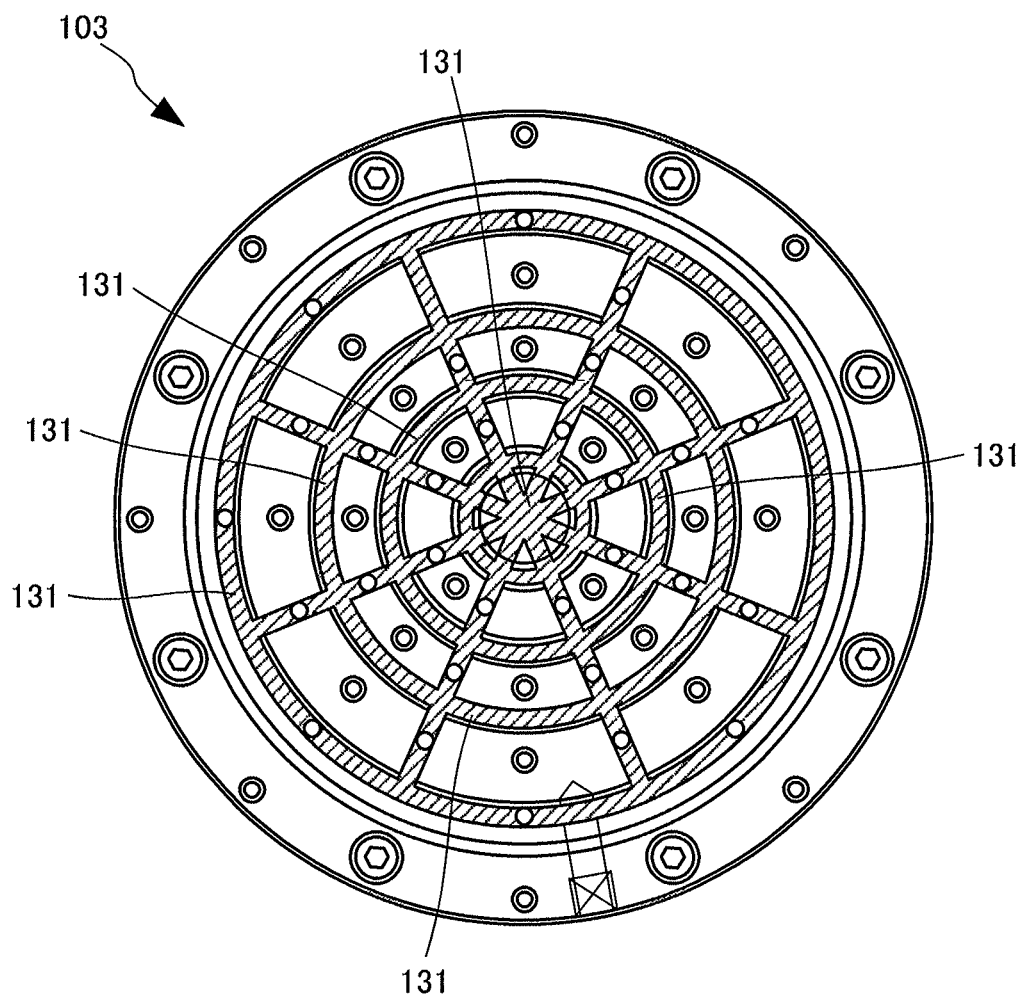
FIG. 2 is a plan view for explaining the structure of a jig included in the three-dimensional laminating and shaping apparatus according to the first embodiment of the present invention.

FIG. 2 is a plan view for explaining the structure of the jig 103 included in the three-dimensional laminating and shaping apparatus 100 according to this embodiment. On the upper surface of the jig 103, that is, the surface which is in contact with the work 120, the groove-shaped channels 131 open to the upper side are formed. The channels 131 are formed in a concentric shape with respect to the center of the jig 103. Furthermore, the linear channels 131 are formed to extend from the center of the jig 103 toward the periphery of the jig 103, thereby connecting the concentric channels 131. Note that the shape of the channels 131 is not limited to this, and any shape capable of cooling the back surface (lower surface) of the work 120 may be adopted.

FIG. 3 is a perspective view for explaining the structure of the channels 131 of the jig 103 included in the three-dimensional laminating and shaping apparatus 100 according to this embodiment. Flow inlets 132 of the cooling medium and a flow outlet 133 of the cooling medium are formed in the channels 131 formed in the jig 103. The cooling medium supplied from the flow inlets 132 flows through the channels 131, reaches the flow outlet 133, and is externally discharged from the flow outlet 133. Since the work 120 can be always cooled by the flesh cooling medium by forming the flow inlets 132 and flow outlet 133 of the cooling medium in the channel 131, the cooling efficiency by the cooling medium can be maintained constant. Since the two flow inlets and one flow outlet are formed, it is possible to always supply a sufficient amount of cooling medium into the jig.

Figure 4:
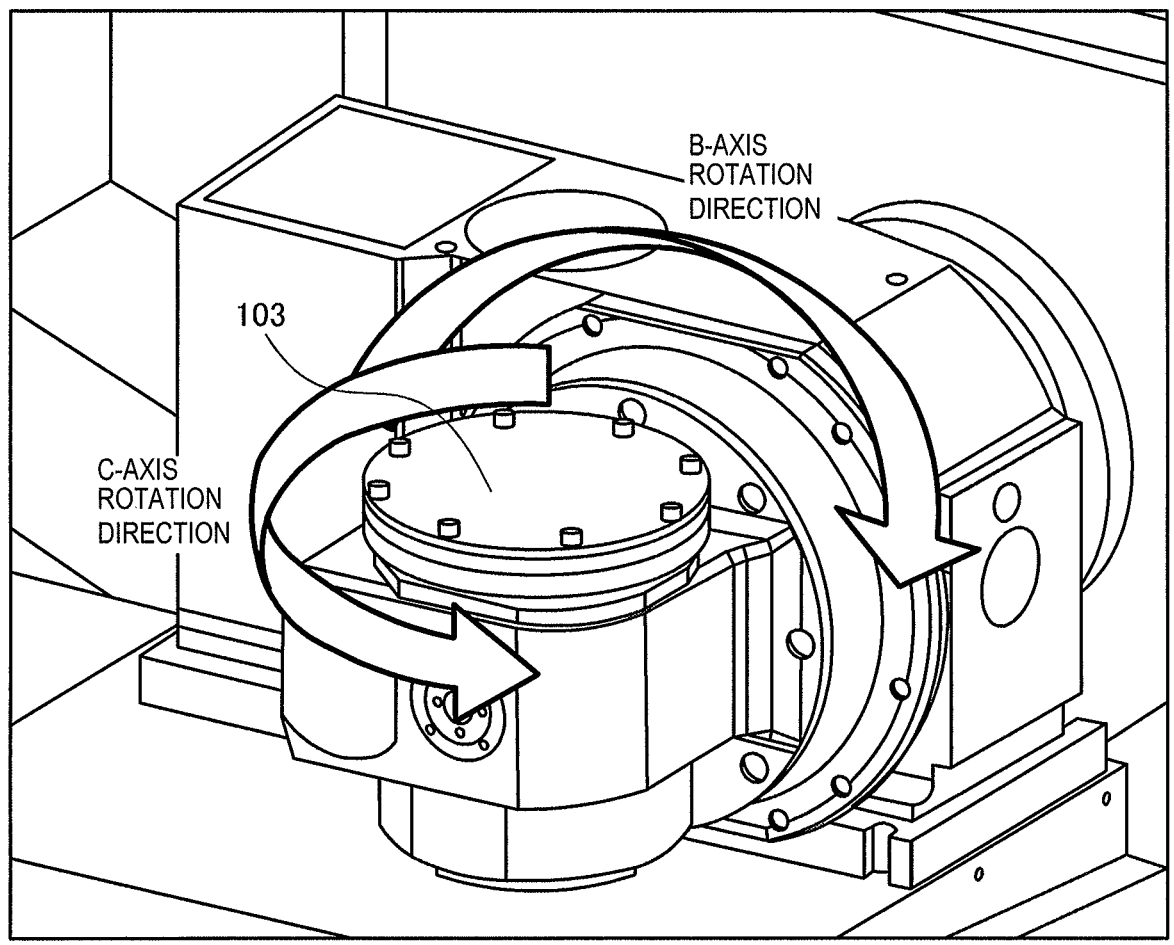
FIG. 4 is a view for explaining the use state of the jig included in the three-dimensional laminating and shaping apparatus according to the first embodiment of the present invention.

FIG. 4 is a view for explaining the use state of the jig 103 included in the three-dimensional laminating and shaping apparatus 100 according to this embodiment. For example, the jig 103 can be attached to an apparatus having rotation axes about which rotation in the B-axis direction and rotation in the C-axis direction are possible, as shown in FIG. 4, and then used. By attaching the jig 103 to such apparatus, it becomes possible to shape the three-dimensional laminated and shaped object 130 having a complicated shape.

Figure 5:
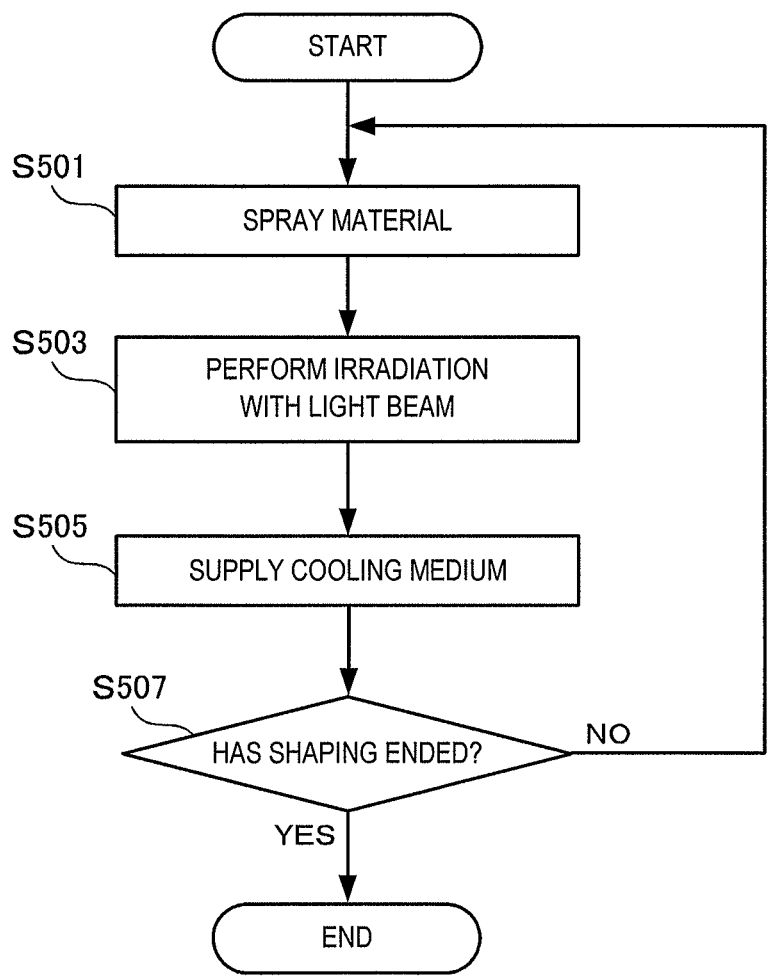
FIG. 5 is a flowchart for explaining the processing procedure of the three-dimensional laminating and shaping apparatus according to the first embodiment of the present invention.

FIG. 5 is a flowchart for explaining the processing procedure of the three-dimensional laminating and shaping apparatus 100 according to this embodiment. In step S501, the three-dimensional laminating and shaping apparatus 100 ejects a metal powder as the material 111 of the three-dimensional laminated and shaped object 130. In step S503, the three-dimensional laminating and shaping apparatus 100 irradiates the ejected material 111 with the light beam 121 such as a laser beam to perform laminating and shaping of the three-dimensional laminated and shaped object 130. In step S505, the three-dimensional laminating and shaping apparatus 100 supplies a cooling medium such as water to the channels 131 formed in the jig 103 immediately after the start of laminating and shaping or when the temperature of the material 111 exceeds a given threshold. In step S507, the three-dimensional laminating and shaping apparatus 100 determines whether laminating and shaping of the three-dimensional laminated and shaped object 130 have ended. If it is determined that laminating and shaping have not ended (NO in step S507), the three-dimensional laminating and shaping apparatus 100 repeats step S501 and the subsequent steps; otherwise (YES in step S507), the three-dimensional laminating and shaping apparatus 100 terminates the processing.

According to this embodiment, since a rise in temperature of the work (laminating base material) is controlled and the occurrence of thermal deformation is suppressed, it is possible to shape a high-precision three-dimensional laminated and shaped object. Since the work can be efficiently cooled, it is possible to improve the shaping accuracy of the three-dimensional laminated and shaped object and the finishing processing accuracy. Since the cooling medium never leaks even if the jig is inclined, it is possible to improve the shaping accuracy and finishing processing accuracy even for a three-dimensional laminated and shaped object having a complicated shape. In addition, since the cooling medium never leaks even if the jig is inclined, it is possible to shape a three-dimensional laminated and shaped object with high shaping accuracy and finishing processing accuracy even on a work having a complicated shape.

Second Embodiment

A three-dimensional laminating and shaping apparatus according to the second embodiment of the present invention will be described with reference to FIG. 6. FIG. 6 is a sectional view for explaining the arrangement of a three-dimensional laminating and shaping apparatus 600 according to this embodiment.

In the three-dimensional laminating and shaping apparatus 600, a jig 603 has a cylindrical shape, and a channel 631 is formed on the outer surface side of the jig 603 having the cylindrical shape. FIG. 6 shows a state in which a flange-shaped work 620 is attached to the cylindrical jig 603. That is, by placing the flange-shaped work 620 on the cylindrical jig 603, the channel 631 formed on the outer surface side of the cylindrical jig 603 is sealed by the work 620. By supplying the cooling medium to flow through the sealed channel 631, it is possible to cool a back surface (inner surface) as a surface on the opposite side of a shaping surface on which a three-dimensional laminated and shaped object 630 is shaped.

According to this embodiment, since the cylindrical jig 603 is adopted, even if the work 620 has a flange shape, it is possible to shape the three-dimensional laminated and shaped object 630 with high shaping accuracy and finishing processing accuracy on the work 620.

Third Embodiment

Figure 7:
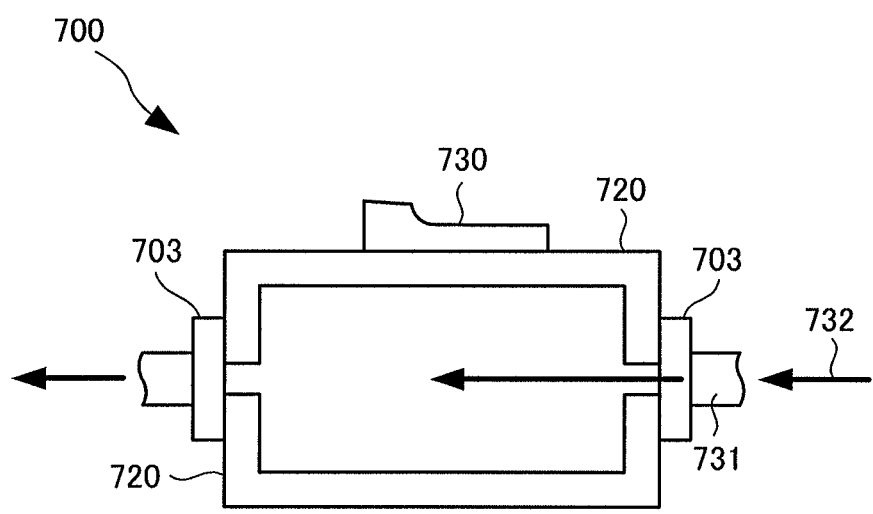
FIG. 7 is a view showing the arrangement of a three-dimensional laminating and shaping apparatus according to the third embodiment of the present invention.

A three-dimensional laminating and shaping apparatus according to the third embodiment of the present invention will be described with reference to FIG. 7. FIG. 7 is a view for explaining the arrangement of a three-dimensional laminating and shaping apparatus 700 according to this embodiment.

In the three-dimensional laminating and shaping apparatus 700, a part with a hollow structure is used as a work 720. The hollow work 720 is set between jigs 703. A channel 731 for supplying a cooling medium 732 is formed in each jig 703. By attaching the work 720 to be sandwiched between the jigs 703, the channels 731 of the jigs 703 and the hollow portion of the work 720 form a channel 731 of the cooling medium 732. That is, by setting the work 720 between the jigs 703, the hollow portion of the work 720 forms part of the channel 731. For example, if the cooling medium 732 is supplied from the jig 703 arranged on the right side, as shown in FIG. 7, the cooling medium 732 passes through the jig 703 on the right side, and is externally discharged from the jig 703 on the left side through the hollow portion of the work 720. Since the cooling medium can flow through the hollow portion of the work 720, the work 720 can be cooled from the inner surface side of the work 720, that is, from the surface (back surface) side on the opposite side of the shaping surface on which the three-dimensional laminated and shaped object 730 is shaped.

According to this embodiment, even if the work 720 has a hollow structure, the work 720 can be cooled from the inner surface side of the work 720, and thus it is possible to suppress thermal deformation occurring in the work 720. Therefore, even if the work 720 has a hollow structure, it is possible to shape a three-dimensional laminated and shaped object 730 with high shaping accuracy and finishing processing accuracy on the work 720.

Fourth Embodiment

Figure 8:
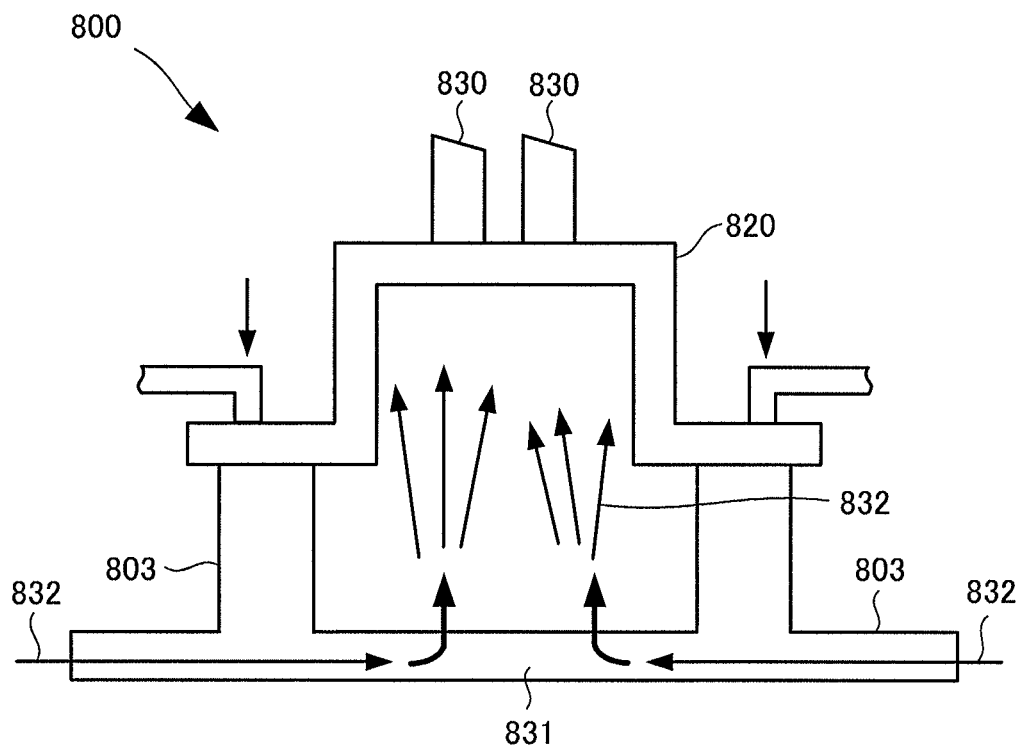
FIG. 8 is a view showing the arrangement of a three-dimensional laminating and shaping apparatus according to the fourth embodiment of the present invention.

A three-dimensional laminating and shaping apparatus according to the fourth embodiment of the present invention will be described with reference to FIG. 8. FIG. 8 is a view for explaining the arrangement of a three-dimensional laminating and shaping apparatus 800 according to this embodiment.

In the three-dimensional laminating and shaping apparatus 800, for example, the cylinder head of the engine of a car or the like is used as a work 820. A jig 803 has a concave portion at the center, and the concave portion serves as a channel 831 open to the upper side. If the work 820 is attached to the jig 803 and the contact portion between the jig 803 and the work 820 is sealed, a hollow space is formed by the work 820 and the channel 831 of the jig 803, thereby obtaining the sealed channel 831.

Then, a cooling medium 832 may flow through the channel 831 formed in the jig 803 and, for example, the cooling medium 832 may be ejected like a fountain to pour the cooling medium on the back surface side of the work 820 or the channel 831 may be filled with the cooling medium 832. If the work 820 is cooled in this way, even if the three-dimensional laminated and shaped object 830 is shaped on the work 820 having a complicated shape such as a cylinder head, it is possible to reliably cool the work 820.

According to this embodiment, even if the work 820 has a complicated shape, it can be cooled from its inner surface side, and thus thermal deformation occurring in the work 820 can be suppressed. Consequently, even if the work 820 has a complicated shape, it is possible to shape a three-dimensional laminated and shaped object 730 with high shaping accuracy and finishing processing accuracy on the work 820.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The present invention is applicable to a system including a plurality of devices or a single apparatus. The present invention is also applicable even when an information processing program for implementing the functions of the embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described embodiments.

The invention claimed is:

1. A three-dimensional laminating and shaping apparatus comprising:
    a material ejector that ejects a material of a three-dimensional laminated and shaped object onto a work on which the three-dimensional laminated and shaped object is shaped;
    a light beam irradiator that irradiates the ejected material with a light beam; and
    a jig to which the work is detachably attached and that includes a channel supplied with a cooling medium for cooling the work,
    wherein the channel is formed on a contact surface side where said jig is in contact with the work, and is open to the contact surface side so that the cooling medium contacts the work, and is formed in a concentric shape with respect to a center of said jig.

2. The three-dimensional laminating and shaping apparatus according to claim 1, wherein the channel has a groove shape open to the contact surface side.

3. The three-dimensional laminating and shaping apparatus according to claim 1, wherein the channel has two flow inlets and one flow outlet.

4. A control method of a three-dimensional laminating and shaping apparatus, comprising:
    ejecting a material of a three-dimensional laminated and shaped object onto a work on which the three-dimensional laminated and shaped object is shaped;
    irradiating the ejected material with a light beam; and
    supplying a cooling medium for cooling the work to a jig to which the work is detachably attached and that includes a channel supplied with the cooling medium,
    wherein the channel is formed on a contact surface side where said jig is in contact with the work, and is open to the contact surface side so that the cooling medium contacts the work, and is formed in a concentric shape with respect to a center of said jig.

5. The control method according to claim 4, wherein the cooling medium is supplied to said jig when a temperature of the work exceeds a given threshold.

* * * * *